United States Patent

[11] 3,593,292

| [72] | Inventor | Robert C. Scott<br>340 Common St., Belmont, Mass. 02178 |
|---|---|---|
| [21] | Appl. No | 864,432 |
| [22] | Filed | Oct. 7, 1969 |
| [45] | Patented | July 13, 1971 |

[54] PERSONAL IDENTIFICATION CIRCUIT CARD DEVICE
15 Claims, 2 Drawing Figs.

| [52] | U.S. Cl. | 340/149 A,<br>40/2.2, 200/43, 200/46 |
|---|---|---|
| [51] | Int. Cl. | H04q 1/00 |
| [50] | Field of Search | 40/2.2;<br>340/149, 339; 200/46, 43; 335/206 |

[56] References Cited
UNITED STATES PATENTS

| 3,399,473 | 9/1968 | Jaffe | 40/2.2 |
|---|---|---|---|
| 3,504,343 | 3/1970 | Ditlow | 340/149 A |

*Primary Examiner*—Donald J. Yusko
*Attorney*—Kenway, Jenney and Hildreth

ABSTRACT: A credit card type device is disclosed in which identification of the bearer is made by means of his ability to complete a switching sequence of a concealed electric circuit within the card and thereby energize an electric lamp or other indicating means. The switching sequence of the circuit is completed by positioning each of a plurality of magnetically movable contact balls across a respective preselected pair of contacts. The balls are constrained to move in respective channels, each of which traverses a series of contact positions.

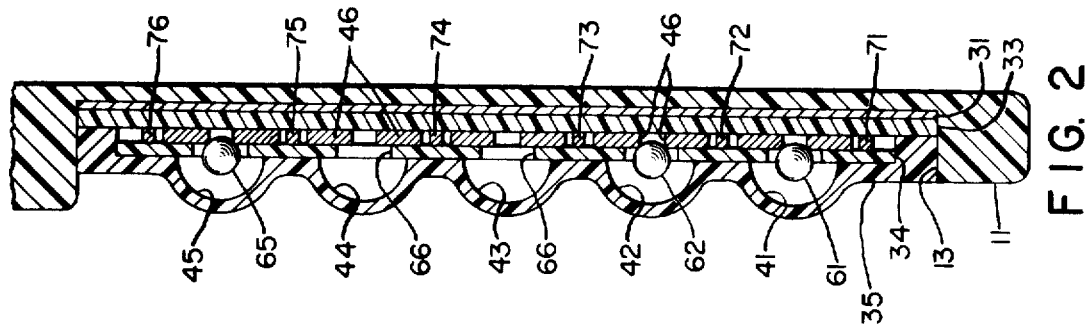
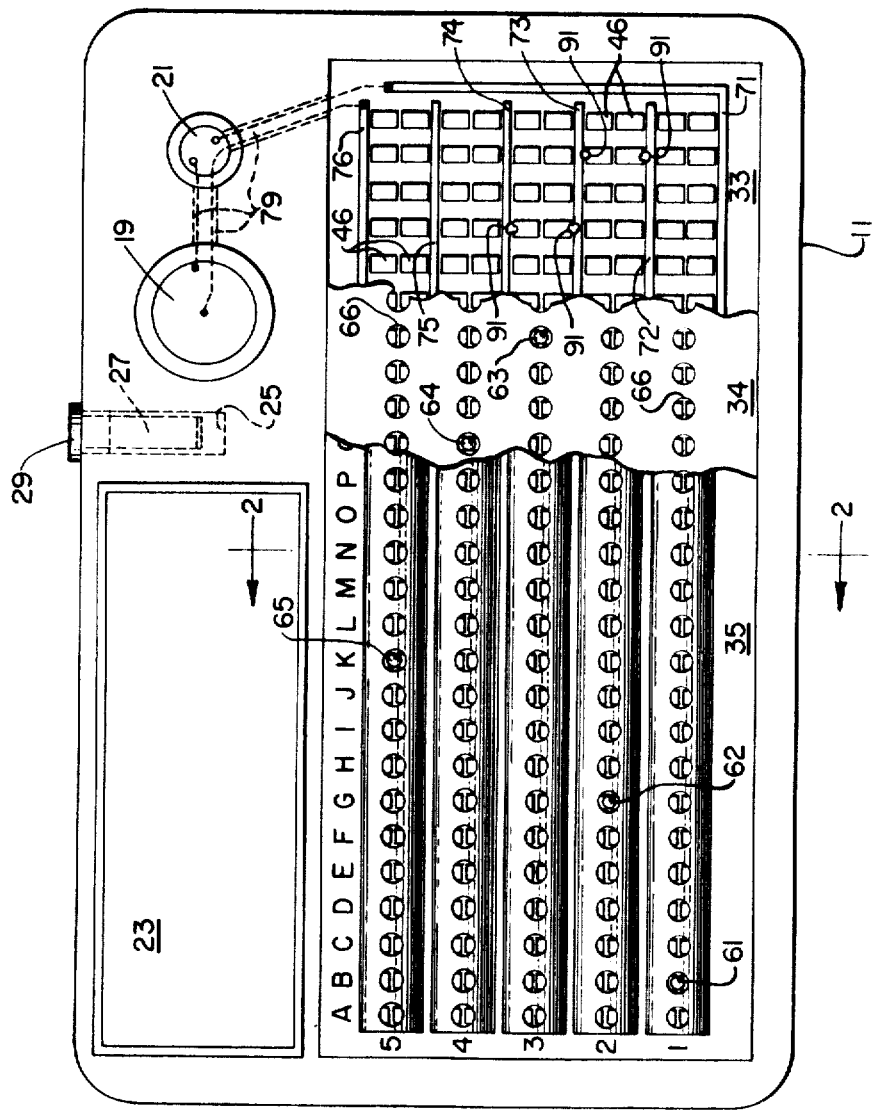
INVENTOR.
ROBERT C. SCOTT 3,593,292

PERSONAL IDENTIFICATION CIRCUIT CARD DEVICE

BACKGROUND OF THE INVENTION

This invention relates to a personal identification device and more particularly to a credit card-type of identification device which permits identification of a bearer by means of his knowledge of a preselected code which he alone knows.

In recent years, it has been increasingly common for various governmental agencies and private companies to issue a multiple of different kinds of identification devices or so-called credit cards as a convenient means of identifying the selected recipients, e.g. for the obtaining of credit or entrance into various locations or facilities. Typically, however, there has been little provision for preventing unauthorized or fraudulent use of such identification devices by other than the bona fide recipients thereof. As is understood, the cancellation or recalling of a given credit card or credit number and the distribution of lists of cards which are no longer authorized has been singularly ineffective in preventing fraudulent use of such devices.

Among the several objects of the present invention may be noted the provision of a personal identification device which facilitates the identification of the authorized bona fide bearer as distinguished from a person who has obtained the device following its loss or theft; the provision of such a device in which the identification is readily accomplished; the provision of such a device which reliably and effectively prevents an unauthorized bearer from being identified as the bona fide holder; the provision of such a device in which the authorized holder is identified by means of his knowledge of a preselected code; the provision of such a device in which the preselected code is known only by the authorized bona fide holder; the provision of such a device providing a large number of such codes thereby reducing the chance of accidental or random discovery thereof to negligible values; the provision of such a device which is ruggedly constructed and long-lived; and the provision of such a device which is relatively simple operationally and inexpensive to manufacture.

Other objects and features will be in part apparent and in part pointed out hereinafter.

SUMMARY OF THE INVENTION

Briefly, a personal identification device according to this invention involves means forming a plurality of channels, each of which encompasses or traverses a series of normally open electrical contact positions. Concealed circuit means are provided for defining a circuit path between an indicating means and a source of electric current with the circuit path extending through a preselectable contact position in each of the channels thereby to energize the indicating means when all of the preselected contact positions are bridged. A magnetically movable, contact bridging member in each channel permits the bridging of a preselected contact position in that channel and a manually operable magnet means is provided for selectively moving the contact bridging members without making physical contact with them. Accordingly, a person may identify himself by positioning each of the contact bridging members in the preselected position in the respective channel so as to energize the indicating means.

BRIEF DESCRIPTION OF THE DRAWING

FIG. 1 is a partially broken away plan view of an identification device constructed in accordance with the present invention; and FIG. 2 is a sectional view, to enlarged scale, taken substantially on the line 2-2 of FIG. 1.

Corresponding reference characters indicate corresponding parts throughout the several views of the drawings.

DESCRIPTION OF THE PREFERRED EMBODIMENT

Referring now to the drawings, the identification device illustrated there is constructed in the form of a card generally resembling a conventional, imprinting-type credit or travel card. The device comprises a molded plastic base 11 including a large, rectangular recess 13 for holding component parts as described hereinafter. A small battery 19 and a small lamp 21 are also molded into the base 11. Battery 19 is preferably of a type, e.g. a mercury cell, having a relatively long shelf life, while the lamp 21 is preferably a solid-state-type lamp, such as a light-emitting diode, which draws very little current when energized and is long-lived. Base 11 may also include an area as indicated at 23 which contains the name and address of the authorized recipient in raised letters so that the card can be employed with conventional imprinting equipment, e.g. for billing purposes. The base 11 preferably also includes a small, laterally facing recess 25 for convenient storage of a small bar magnet 27, the use of which is described hereinafter. Magnet 27 is provided with a holder or cap 29.

With reference to FIG. 2, there are assembled in the recess 13 a metallic shielding sheet or plate 31, a circuit board 33, a locating panel 34 and a cover 35. As is explained in greater detail hereinafter, the circuit board 33 carries a conductive pattern which comprises a plurality of raised conductive portions or elements which serve as contact and circuit elements. As is understood by those skilled in the art, such a conductive pattern may be readily formed by etching a composite or laminate circuit board according to known printed-circuit techniques.

The cover 35 may also be molded of a plastic or resin material and is shaped to define a plurality of generally parallel, longitudinal channels 41—45 over the circuit board. The conductive portions on circuit board 33 are shaped to define several series of normally open contact pairs, there being one such series lying along each of the channels 41—45. Representative contact pairs are indicated by the reference character 46.

During assembly of the device, a respective magnetically attractable, conductive sphere or ball 61—65 is placed in each of the channels 41—45. Gold plated steel balls are preferred. The contact pairs are shaped and positioned so that a selected pair can be bridged by the conductive ball 61—65 retained within the respective channel. The locating panel 34 is regularly apertured, as indicated at 66, so that the contact balls 61—65 are constrained to one or another of the contact bridging positions when the card is upright in the horizontal position. The various channels are conveniently designated by number designations imprinted in the cover 35 and the different contact positions along each channel may be identified by letter designations imprinted across the upper edge of the cover as illustrated in FIG. 1. The cover 35 is securely cemented to base 11 thereby sealing all component parts with the exception of battery 19 and indicating lamp 21 within the cover 35 and base 11 enclosure.

The conductive portions carried on the upper surface of printed circuit board 33 also form a plurality of bus bars 71—76 extending parallel to the channels 41—45 between the adjacent series of contact pairs 46. The bus bar 71 also comprises a transverse portion extending across the right-hand end of the printed circuit board as may be seen in FIG. 1.

Lamp 21 and battery 19 are interconnected in a series circuit in the following manner. One terminal of the battery is connected to one terminal of the lamp and the remaining terminal of each is connected to a respective one of the outer bus bars 71 and 76. These connections may be made by means of insulated wires 79 embedded in the plastic resin forming the base 11. In addition, one contact pair in each series of contact pairs is connected between the adjacent pair of bus bars. This connection may be made by means of solder bridging the gap between each selected contact portion and the adjacent bus bar, as indicated at 91 in FIG. 1, or by any other convenient means, e.g. as a part of the original printed-circuit etching process. The locating panel is preferably constructed of a completely opaque insulating material so that these connections cannot be discovered without destroying the device. The cover 35 may then be transparent to facilitate locating of the balls 61—65. The shield plate 31, which is preferably constructed of lead, prevents discovery of these connections by radiological examination.

The selection of a particular contact pair in each of the several series of contact pairs establishes a code which can be used to identify the individual card and its respective authorized bearer. For example, in the device illustrated, the code might be BQWYN. In a system constructed as illustrated in which there are five series of 26 possible contact positions, a total of 11,881,376 possible combinations or codes are available. Thus, the likelihood of duplicating a given code by random experimentation is highly remote.

In operation, the authorized bearer of the device may readily identify himself by employing the magnet 27 to position each of the balls 61—65 in the correct position to bridge the respective preselected contact pair. By so arranging the balls, the series circuit linking the battery 19 and the lamp 21 will be completed, energizing the lamp and signaling that the preselected code has been matched. While the locater plate 34 serves to retain each ball in the selected location so long as the device is maintained generally upright in a horizontal plane, the code setting can be quickly removed or erased by merely tilting the card so that the balls fall out of the critical locations. As noted previously, the chance of an unauthorized user being able to discover the code by a trial and error procedure is extremely remote in view of the large number of possible combinations. As is understood, the number of possible combinations increases as an exponential function of the number of elements, assuming that the number of choices for each selection element is maintained constant. Thus, the number of possible combinations can be greatly increased by adding additional channels.

While it is preferred to incorporate the indicating means and its power source into the identification device itself so the identification device is operational without external apparatus, it should be understood that the coded switching means may be employed by itself to complete a testing circuit external to the device.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What I claim is:

1. A personal identification device comprising:
   means forming a plurality of channels each of which encompasses a series of normally open contact positions;
   circuit means for defining a circuit path between an indicating means and a source of electric current, which circuit path extends through a preselectable contact position in each of said channels thereby to energize said indicating means when all of the preselected contact positions are bridged.
   a respective magnetically movable contact bridging member in each channel for bridging a selected contact position in that channel; and
   manually operable magnet means for individually moving said contact bridging members whereby a person may identify himself by positioning each of said contact bridging members in the preselected position in the respective channel thereby energizing said indicating means.

2. An identification device as set forth in claim 1 wherein said indicating means is a lamp and said current source is a battery.

3. An identification device as set forth in claim 1 wherein said circuit means comprises a printed circuit board.

4. An identification device as set forth in claim 3 wherein said circuit board includes a conductive portion on one surface thereof forming a plurality of series of contact pairs, there being one contact pair for each of said contact position.

5. An identification device as set forth in claim 4 wherein said circuit board also includes conductive portions forming bus bars between adjacent series of contact pairs whereby a pair in each series can be selected by connecting the corresponding conductive portions to the adjacent bus bars.

6. An identification device as set forth in claim 5 wherein said contact bridging means comprises a conductive ball in each channel.

7. An identification device as set forth in claim 6 wherein said device includes a locating panel over said circuit board for permitting each ball to contact the circuit board only at the respective contact positions.

8. An identification device as set forth in claim 1 wherein said device includes means for storing said magnet means.

9. An identification device as set forth in claim 1 wherein said device is constructed in the shape of a relatively flat card.

10. A personal identification device comprising:
    a circuit board;
    a cover for said circuit board, said cover defining a plurality of generally parallel channels over said board, said board having conductive portions thereon forming a series of normally open switch contact pairs along each channel and means defining a series circuit extending through a preselected contact pair in each series of contact pairs;
    a respective magnetically attractable, conductive ball movable along each channel for bridging a selected contact pair in that channel; and
    a manually operable magnet for individually moving said balls in their respective channels through said cover whereby a person may identify himself by positioning each of said balls so as to bridge the respective preselected contact pair thereby completing said series circuit.

11. A personal identification device comprising:
    a solid state lamp;
    a battery;
    a circuit board;
    a cover for said circuit board, said cover defining a plurality of generally parallel channels over said board, said board having conductive portions thereon forming a series of normally open switch contact pairs along each channel and means defining a series circuit extending through a preselected contact pair in each series of contact pairs;
    a respective magnetically attractable, conductive ball movable along each channel for bridging a selected contact pair in that channel;
    a locating panel apertured to permit each ball to contact said circuit board only at positions corresponding to each contact pair and to conceal the series circuit linking the selected contact pairs; linking
    means interconnecting said lamp, said battery and said contact linking circuit for energizing said lamp when all of the selected contact pairs are bridged; and
    a manually operable magnet for individually moving said balls in their respective channels through said cover whereby a person may identify himself by positioning each of said balls so as to bridge the respective preselected contact pair thereby completing said series circuit.

12. An identification device as set forth in claim 11 wherein said battery comprises a mercury cell.

13. An identification device as set forth in claim 11 wherein said lamp is a light-emitting diode.

14. An identification device as set forth in claim 11 further comprising a base to which said cover is sealed thereby preventing investigation of the preselected combination of contact pairs.

15. An identification device as set forth in claim 14 further comprising a metallic shielding plate in said base for preventing radiological examination of said circuit board.